United States Patent [19]

Geier et al.

[11] 4,324,366
[45] Apr. 13, 1982

[54] CONTROL SYSTEM FOR REGULATING A SPRAY GUN PAINT PRESSURE

[75] Inventors: Georg Geier; Manfred Löhne, both of Hanover, Fed. Rep. of Germany

[73] Assignee: WABCO Steuerungstechnik, Hanover, Fed. Rep. of Germany

[21] Appl. No.: 155,333

[22] Filed: Jun. 2, 1980

[30] Foreign Application Priority Data

Jun. 15, 1979 [DE] Fed. Rep. of Germany ....... 2924264

[51] Int. Cl.³ .................................................. B05B 1/30
[52] U.S. Cl. ................................ 239/533.1; 239/570;
222/55; 137/487.5
[58] Field of Search ............... 239/63, 533.1, 569, 239/570, 101, 526, DIG. 14, 67; 222/55; 137/487.5; 118/685

[56] References Cited

U.S. PATENT DOCUMENTS

| | | | |
|---|---|---|---|
| 3,605,683 | 9/1971 | Wiggins | 118/685 |
| 3,726,307 | 4/1973 | Carman et al. | 137/487.5 |
| 4,084,539 | 4/1978 | Schmidt | 118/685 |

*Primary Examiner*—Robert B. Reeves
*Assistant Examiner*—Paul A. Sobel
*Attorney, Agent, or Firm*—G. J. Falce

[57] ABSTRACT

A control system for automatically regulating a spray gun paint pressure in which an ideal pressure value is represented by a current flow in a collection line and the real pressure value is represented by a voltage signal that sets a voltage to current transducer via which the collector line current flows. A bypass resistor is connected to the collection line across the inputs of a differential amplifier in a control circuit that controls a supply and exhaust valve for the spray gun paint pressure. As collector line current flows via the voltage to current transducer decreases consistent with the real pressure value being reduced relative to the ideal pressure value, increased current flows via the bypass resistor, thereby increasing the voltage potential across the inputs of the differential amplifier to cause the control circuit to operate the supply valve and accordingly increase the real pressure value to the level of the ideal pressure value.

7 Claims, 1 Drawing Figure

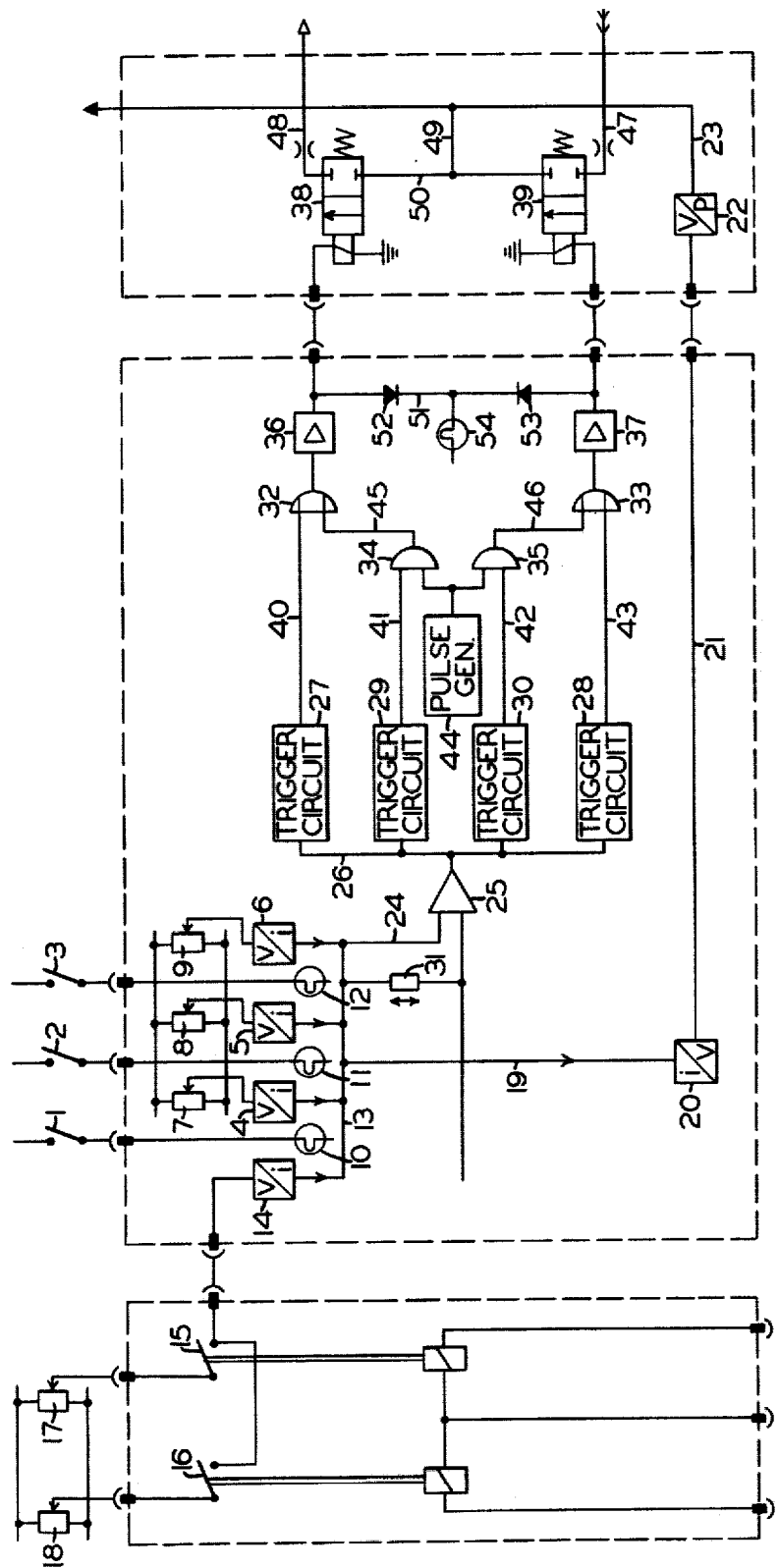

CONTROL SYSTEM FOR REGULATING A SPRAY GUN PAINT PRESSURE

BACKGROUND OF THE INVENTION

The present invention is related to a pressure control system for a paint sprayer and more particularly to such a control system in which the paint spray is automatically regulated in accordance with an ideal pressure value.

In paint spraying operations, it often becomes necessary to vary the amount of paint being sprayed during a certain time period. An example of this is when painting an automobile body passing through a paint spray at a constant speed, since the paint must cover panels having different shapes with a substantially even thickness of paint. If the paint spray were not varied, different panel areas would receive different thicknesses of paint, due to their different surface contours. In order to vary the amount of paint being sprayed on different panel areas, various metering valves have been employed, which can be programmed such that each panel area receives the desired amount of paint. These several metering valves have the disadvantage of requiring individual control circuits, which are unable to monitor and correct the control pressure affecting the paint spray.

SUMMARY OF THE INVENTION

The object of the present invention, therefore, is to provide a paint spray control system capable of automatically regulating the paint spray in accordance with a predetermined condition, by utilizing a single closed-loop control circuit.

In carrying out the above objective, the invention has the advantage of providing a rapid and precise adjustment in the pressure controlling the paint spray, so that a uniform thickness of paint is assured on all parts of the object to be painted. In addition, a savings in the amount of paint used is realized. Other objects and attendant advantages of the invention will become apparent from the following description when taken with the single FIGURE drawing showing a circuit diagrammatic comprising the invention.

DESCRIPTION AND OPERATION

Essentially, the device of the invention consists of a control circuit arrangement consisting of three circuit portions, an ideal-value circuit for setting a variable ideal pressure value, a circuit for identifying the real pressure value prevailing in the consumer line, and a circuit for measuring the deviation of the real pressure value from the ideal pressure value and adapting the real pressure value to the ideal pressure value.

The circuit portion for setting the ideal pressure value consists of an input device, shown here in the form of three switches 1, 2 and 3, which are connected with voltage-current transducers 4, 5 and 6, respectively; each of the three voltage-current transducers 4, 5, 6 is connected with potentiometers 7, 8 and 9, respectively. The potentiometers 7, 8, 9 are used to set the voltages to be supplied via switches 1, 2 and/or 3. Lamps 10, 11, 12 are assigned to each of switches 1, 2 and 3, respectively, to indicate the operation of the input device. The outputs of the voltage-current transducers 4, 5, 6 are interconnected via a collection line 13. Another voltage-current transducer 14, whose output is also connected to the collection line 13, has its input connected to two potentiometers 17, 18 via switches 15 and 16, which are designed as relays in this example. This circuit is also a component of the ideal-value circuit and is used to set a basic pressure. From the collection line 13, a line 19 leads to a voltage-current transducer 20, which is a component of the circuit portion for determining the real pressure value. A line 21 connects the voltage-current transducer 20 with the output of a pressure-current transducer 22, whose input is connected with a pressure-medium consumer (not shown) via a pressure-medium line 23. In the pressure-voltage transducer 22, the pressure delivered to the consumer is converted to a corresponding voltage, which is in turn transformed in the voltage-current transducer 20 to a current corresponding to this voltage.

The circuit portion for adapting the real pressure value to the ideal pressure value is composed of an addition circuit (voltage-current transducers 4, 5, 6, 14 and collection line 13), a difference amplifier 25 connected with the collection line 13 via a line 24, and a resistor 31 connecting the collection line 13 with a second input of the difference amplifier 25, as well as four trigger circuits 27, 28, 29, 30, whose inputs are connected to the output of the difference amplifier 25 via a line 26. The outputs of triggers 27, 28, 29 and 30 are connected with the control portion of two solenoid operated spool valves 38 and 39 designed as two-way supply and exhaust valves, respectively, via logical decision elements 32, 33, 34 and 35 designed as gate switches, and two amplifiers 36 and 37. A line 40 leads from trigger 27 to the first input of an OR gate 32, a line 43 leads from trigger 28 to the first input of an OR gate 33, a line 41 leads from trigger 29 to the first input of an AND gate 34, and a line 42 leads from trigger 30 to the first input of an AND gate 35. The second input of the AND gate 34 and the second input of AND gate 35 are connected to a pulse generator 44. The output of the AND gate 34 is connected with the second input of the OR gate 32 via a line 45, and the output of AND gate 35 is connected with the second input of OR gate 33 via a line 46. The input of the supply valve 39 is connected with the pressure medium source via a pressure-medium line 47, and the exhaust valve 38 is connected with the atmosphere via a pressure-medium line 48. The output of the supply valve 39 is connected with the input of the exhaust valve 38 and the pressure-medium line 23 leading to the consumer via pressure-medium lines 50 and 49. The outputs of amplifiers 36 and 37 are connected with an indicator lamp 54 via a common line 51. To prevent the output signals of amplifier 36 from reaching the output line of amplifier 37 or vice versa, two diodes 52 and 53 are provided in line 51.

The operation of the device of the invention is described in the following on the basis of two hypothetical pressure values.

A set voltage is applied to potentiometer 17 or 18, corresponding to a basic pressure of 3 bar, by means of which pressure a specific amount of paint per unit of time is sprayed. The adjusted voltage is converted in the voltage-current transducer 14 to a corresponding current. Assuming no pressure yet exists in pressure-medium line 47, transducer 22 feeds back a corresponding voltage signal to transducer 20, which accordingly inhibits current flow in line 19. Current in line 13 is thus caused to flow via resistor 31, thereby establishing a voltage drop across the resistor and a corresponding voltage gradient at the inputs of difference amplifier 25. The direction of this voltage gradient produces a positive polarity output at difference amplifier 25, which is transmitted to triggers 27 through 30. Since triggers 27, 28, 29, 30 have different polarity operating thresholds, trigger 28, for example, will be triggered if the deficiency of the real value from the ideal value is large, and trigger 30 will be triggered if this deficiency is small. Trigger 28 sends a continuous signal to the solenoid of supply valve 39 via OR gate 33 and amplifier 37; and trigger 30 subsequently emits a pulsing signal to the solenoid of supply valve 39 via the AND gate 35, OR gate 33 and amplifier 37. As the real pressure value in line 49 increases via supply valve 39, toward the ideal pressure value, transducer 20 becomes capable of accepting increased current flow in line 19, thus reducing the level of current flow via resistor 31 and in turn reducing the voltage gradient across the inputs of amplifier 25. When the real and ideal pressure values correspond, full current in collection line 13 is able to flow via transducer 20, thus terminating current flow via resistor 31. The voltage gradient across the inputs of amplifier 25 thus disappears and the amplifier output is lost, so that triggers 28 and 30 no longer are effective to operate supply valve 39, which thus terminates further pressure supply.

As mentioned above, the amount of paint to be sprayed per unit of time must be changed when the objects to be coated are not flat and have curves, edges, cross-pieces, etc.

In this example, we shall assume that the amount of paint to be sprayed is to be increased to apply to the part of the object lying further away from the spray elements of the spray unit, a coating of paint of a thickness equal to that on the parts lying closer to the spray elements.

This more distant part can be sensed by any suitable sensing elements, and the information can either be sent to the ideal-value circuit or it can be fed to it in the form of a program. In order to increase the amount of paint, it is necessary to increase the pressure in line 49. In the device of the invention, this is accomplished by actuating one of the three circuits 1, 2, 3. Each of the potentiometers 7, 8, 9 assigned to one of the switches is adjusted to a specific voltage value. If, for example, a pressure of 4 bar is desired to spray a larger amount of paint, switch 3 is actuated in this example. The voltage set by potentiometer 9 is transformed to a corresponding current in the voltage-current transducer 6 and applied to the collection line 13. The current originating in the voltage-current transducer 6 is added to the current originating in the voltage-current transducer 14. Since a current is now present in collection line 13 that is supposed to correspond to a pressure of 4 bar, whereas a current corresponding to the real pressure value of 3 bar is present in the voltage-current transducer 20, the voltage-current transducer 20 is unable to conduct the increased current from the collection line 13 via line 19. The result is a voltage drop in the resistor 31, via which the excess current is bypassed, and an increase in the voltage gradient through the difference amplifier 25. The output signal of the difference amplifier 25 reaches triggers 27, 28, 29, 30. Trigger 28 responds and sends a continuous signal to the solenoid of supply valve 39 via the OR gate 33 and amplifier 37. The pressure in the device for spraying the paint is raised to the desired value. The voltage in the pressure-voltage transducer 22 increases continuously. The current is also increased in the voltage-current transducer 20 in accordance with this voltage, thus accommodating increased current flow from conduction line 13 via line 19 and accordingly reducing the current flow via resistor 31.

When the current corresponding to the real pressure value has reached the value of the current corresponding to the ideal pressure value, full current is accepted by the voltage-current transducer 20, and the voltage gradient in the resistor 31 becomes zero. Since there is therefore no difference between the inputs of the difference amplifier 25, the signal at the inputs of the triggers disappears, and the supply solenoid 39 closes.

When the real pressure value is higher than the ideal pressure value, triggers 27 and 29 respond, switching the exhaust valve solenoid to the desired value by reducing the pressure in line 47.

It is possible to use either a digital or analog design of the switching part for setting the ideal pressure value and for the comparator circuit.

The device of the invention can be designed for any number of ideal pressure-value programs by supplementing the switches, potentiometers and voltage-current transducers in the part for presetting the ideal pressure value.

Having thus described the invention, what we claim as new and desire to secure by Letters Patent, is:

1. A control system for automatically regulating the amount of paint emitted by a spray gun, said control system comprising:
   (a) a consumer line connected to said spray gun;
   (b) control valve means for varying the pressure in said consumer line and accordingly the desired amount of paint to be emitted by said spray gun;
   (c) a control circuit including a differential amplifier having first and second inputs and an output providing a polarity signal when a voltage potential exists across said first and second inputs to operate said control valve means depending upon the sense of said polarity signal;
   (d) means for providing a control signal representative of the ideal pressure of said consumer line including a collection line connected to said first input of said differential amplifier, said collection line having an electric current corresponding to said control signal;
   (e) first transducer means connected to said consumer line for providing a voltage signal representative of the actual pressure of said consumer line;
   (f) second transducer means connected between said first transducer means and said collection line for conducting the flow of electric current therefrom in accordance with said voltage signal;
   (g) a reference potential line connected to said second input of said differential amplifier; and
   (h) a resistor connected between said collection line and said reference potential line via which current in said collection line flows when the current thereof deviates from the current of said second transducer to thereby establish said voltage potential across said first and second inputs of said differential amplifier.

2. A control system as recited in claim 1, wherein said means for providing said control signal further comprises:
   (a) first potentiometer means for providing a first voltage signal;
   (b) second potentiometer means for providing at least one additional voltage signal;

(c) third transducer means for converting said first voltage signal to a corresponding current signal; and (d) fourth transducer means for converting said at least one additional voltage signal to a corresponding current signal, said third and fourth transducer means being connected in parallel to said collection line to provide said control signal by the addition of said current signals of said third and fourth transducer means.

3. A control system as recited in claim 1 or 2, wherein said control valve means comprises:
   (a) a first solenoid operated, two-way valve device having an inlet connected to a source of fluid pressure and an outlet connected to said consumer line; and
   (b) a second solenoid operated, two-way valve device having an inlet connected to said consumer line and an outlet connected to atmosphere.

4. A control system as recited in claim 3, wherein said control circuit further comprises:
   (a) first trigger circuit means for energizing the solenoid of said first valve device when said polarity signal of said differential amplifier is in a first sense, so as to connect said source of fluid pressure to said consumer line; and
   (b) second trigger circuit means for energizing the solenoid of said second valve device when said polarity signal of said differential amplifier is in a sense opposite said first sense, so as to connect the fluid pressure of said consumer line to atmosphere.

5. A control system as recited in claim 4, wherein said first and second trigger circuit means each comprise:
   (a) a low threshold trigger circuit having an input subject to said polarity signal and an output;
   (b) a high threshold trigger circuit having an input subject to said polarity signal and an output;
   (c) a pulse generator;
   (d) a logical AND gate having one input connected to the output of said low threshold trigger circuit, another input connected to said pulse generator, and an output; and
   (e) a logical OR gate having one input connected to the output of said high threshold trigger circuit, a second input connected to the output of said logical AND gate, and an output via which the solenoid of a respective one of said first and second valve device is energized either continuously or intermittently, depending upon said polarity signal being of such potential as to trigger said high or said low trigger circuit.

6. A control system as recited in claim 1 further characterized in that said current flow via said resistor varies inversely with said current flow via said second transducer means.

7. A control system as recited in claim 6, further characterized in that said current flow via said second transducer means varies in direct relationship with said voltage signal.

* * * * *